No. 693,575. Patented Feb. 18, 1902.
G. THUILLIER.
HAND SHEARS FOR CUTTING METALS OR OTHER HARD MATERIALS IN SHEETS.
(Application filed Dec. 10, 1900.)
(No Model.) 2 Sheets—Sheet 1.
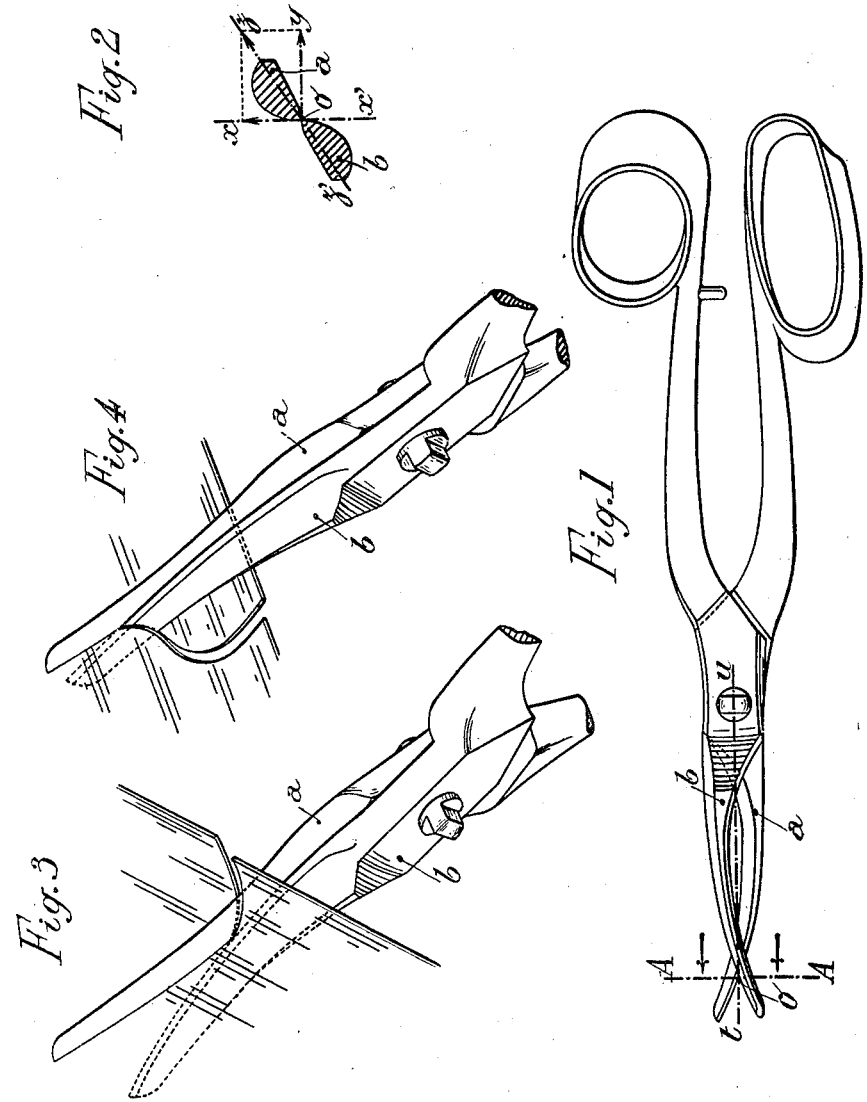
Witnesses:
Henry Phiems
George Barry Jr
Inventor:
Georges Thuillier
by attorneys
Brown & Seward

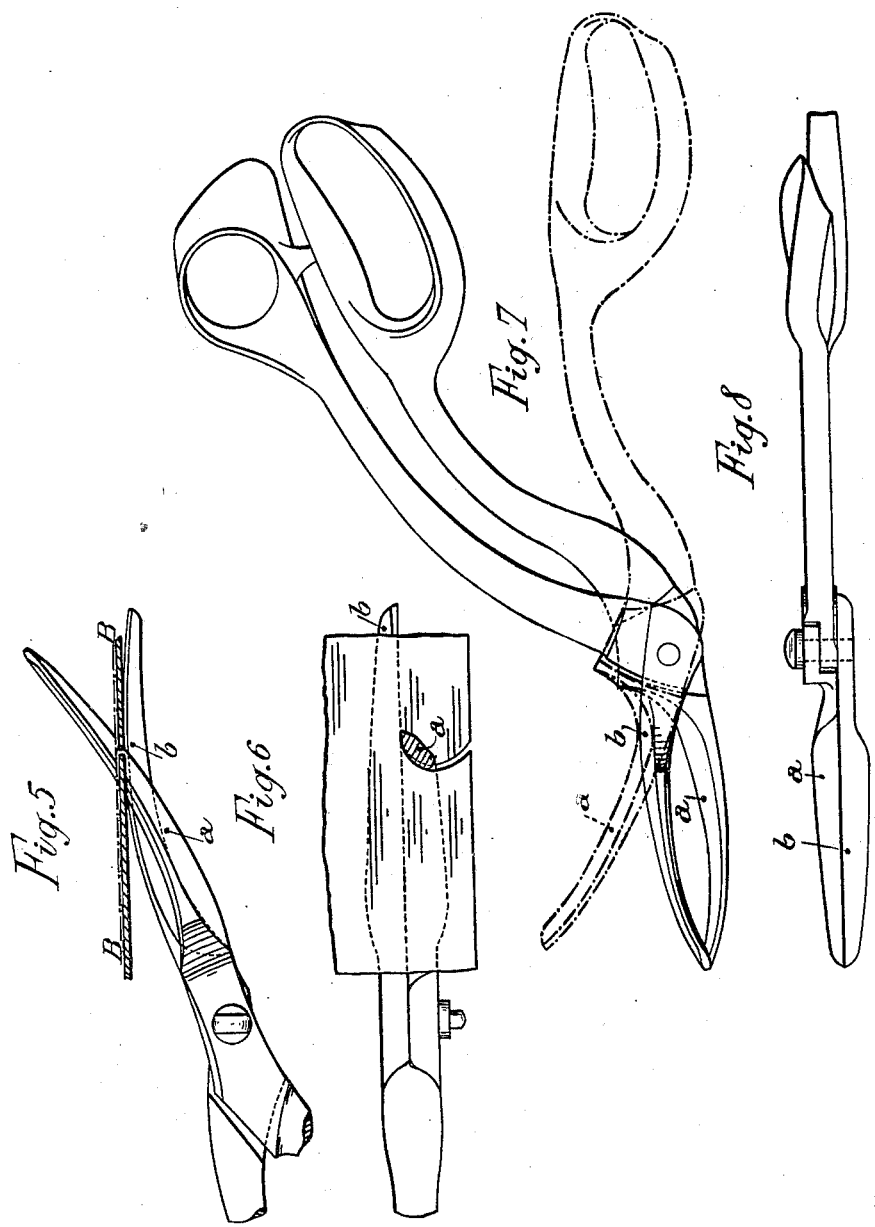

UNITED STATES PATENT OFFICE.

GEORGES THUILLIER, OF NOGENT-EN-BASSIGNY, FRANCE.

HAND-SHEARS FOR CUTTING METALS OR OTHER HARD MATERIALS IN SHEETS.

SPECIFICATION forming part of Letters Patent No. 693,575, dated February 18, 1902.

Application filed December 10, 1900. Serial No. 39,312. (No model.)

*To all whom it may concern:*

Be it known that I, GEORGES THUILLIER, manufacturer, a citizen of the Republic of France, and a resident of Nogent-en-Bassigny, Haute-Marne, France, have invented new and useful Improvements in Hand-Shears for Cutting Metals or other Hard Materials in Sheets, of which the following is a specification.

The present invention relates to a kind of hand-shears which owing to the special configuration of their cutting-blades permit of the cutting of hard sheet materials—such as metals, leather, linoleum, cardboard, &c.—with equal facility in a curve of any form as in a straight line without twisting same. The two blades are provided with operating-handles and are articulated in the manner of ordinary shear-blades. Both blades are alike, and they are arranged symmetrically. Each of them is curved longitudinally and in transverse section presents such form approximately lenticular as to present on the inner face a surface curved outwardly directly from the cutting edge and as to have its greatest thickness situated in a direction at a great inclination in relation to the plane of the cut perpendicular to the axis of articulation of the blades. Owing to this construction the shears are capable of cutting the most difficult curves without twisting or distorting the sheet.

I will now proceed to describe my invention in connection with the accompanying drawings, which illustrate an example of the improved shears.

Figure 1 is an elevation of a pair of shears, the operating-arms of which are of the ordinary form. Fig. 2 is a section, on an enlarged scale, through the line A A, Fig. 1. Figs. 3 and 4 are perspective views illustrating the action of the shears. Fig. 5 is an elevation showing the shears in the working position. Fig. 6 is a horizontal section through line B B, Fig. 5. Figs. 7 and 8 are respectively a side elevation and a plan view of shears only differing from those shown in Fig. 1 in the form and the arrangement of the operating-arms.

$a$ and $b$ indicate two cutting-blades, which are curved longitudinally, so that the angle which they form at the cutting-point does not vary appreciably during the operation, which permits of the cut being effected without any great variation of power or effort throughout the whole period of the closing movement of the two blades. In the transverse section the two blades present the approximately lenticular form indicated in Fig. 2, their greatest dimension or thickness being in the direction of the line $zz'$, which is at a great inclination in relation to the cutting-plane $xx'$, and their inner surfaces curving outward directly from their cutting edges. These blades are absolutely symmetrical in relation to the cutting-line $tu$, which passes through the axis of articulation $u$ and the successive points of cut, such as $o$, Figs. 1 and 2. The blades thus formed are exceedingly firm or rigid, because their greatest thickness is in the direction in which they tend to bend. In fact the strain to which each blade is subjected may be divided into two. These are, for the upper blade, for example, first, the reactionary force $ox$, opposed to the movement of the blade, and, second, a strain $oy$, which owing to the resistance to the cut, tends to force the blades asunder. Therefore it will be seen in Fig. 2 that the greatest thickness of the blade is just in the direction of the resultant $oz$ of these two forces $ox$ and $oy$. Further, Figs. 3 and 4 clearly show that owing to the special conformation of the blades the shears are capable of readily effecting a cut of any curvature without twisting the sheet of material. The reason of this is because the part of the sheet already cut which is situated on the side of the line of cut opposed to that of the center of curvature at the cutting-point can always pass without any material distortion either under the lower blade, Fig. 4, or over the upper blade, Fig. 3, the concave portion of the cut portion turning around this blade, as indicated in Figs. 5 and 6.

In order that the hand operating the shears may not be incommoded in its movements by the portions of the sheet already cut which are situated beneath it, the operating-arms may be raised or bent upward, as shown in Fig. 7. Further, in order that the part of the sheet already cut which rests upon the lower blade should not come into contact with the operating-arms, and consequently that the shears may always move forward without any obstacle, the two arms and handles are offset laterally from the cutting-plane on the side of the upper blade, as shown in Fig. 8.

I claim—

1. Hand-shears for cutting metals and other materials in sheets, composed of two symmetrical cutting-blades provided with operating-arms and articulated in the manner of ordinary shear-blades, in which each of the blades is curved longitudinally and has a transverse section of such approximately lenticular form as to present on the inner face a surface curved outward directly from the cutting edge and as to have its greatest thickness situated in a direction at an inclination in relation to the plane of cut perpendicular to the axis of articulation of the blades, substantially as and for the purpose specified.

2. Hand-shears for cutting metals and other hard materials in sheets, composed of two symmetrical cutting-blades provided with operating-arms and articulated in the manner of ordinary shear-blades, in which each of the blades is curved longitudinally and has a transverse section of such approximately lenticular form as to present on the inner face a surface curved outward directly from the cutting edge and as to have its greatest thickness situated in a direction at an inclination in relation to the plane of cut perpendicular to the axis of articulation of the blades, and in which both the handles are raised and offset laterally from the cutting-plane on the side of the upper blade, substantially as and for the purpose specified.

In testimony that I claim the foregoing as my invention I have signed my name, in presence of two witnesses, this 23d day of November, 1900.

GEORGES THUILLIER.

Witnesses:
 THOMACHOT,
 RIERKEN.